United States Patent
Yoo et al.

(10) Patent No.: US 9,413,014 B2
(45) Date of Patent: Aug. 9, 2016

(54) PROCESS OF PREPARING CARBON-SUPPORTED METAL CATALYST BY PHYSICAL DEPOSITION

(71) Applicants: KOREA INSTITUTE OF SCIENCE AND TECHNOLOGY, Seoul (KR); GL MATERIALS INC., Seoul (KR)

(72) Inventors: Sung Jong Yoo, Seoul (KR); Hee-young Park, Seoul (KR); Jong Hyun Jang, Seoul (KR); Hyoung-Juhn Kim, Gyeonggi-do (KR); Tae-Hoon Lim, Seoul (KR); Sang Young Lee, Seoul (KR); Sang Hyun Ahn, Seoul (KR); Namgee Jung, Seoul (KR); Suk Woo Nam, Seoul (KR); Eun Ae Cho, Seoul (KR); Seok Keun Koh, Seoul (KR)

(73) Assignees: KOREA INSTITUTE OF SCIENCE AND TECHNOLOGY, Seoul (KR); GL MATERIALS INC., Seoul (KR)

( * ) Notice: Subject to any disclaimer, the term of this patent is extended or adjusted under 35 U.S.C. 154(b) by 7 days.

(21) Appl. No.: 14/171,906

(22) Filed: Feb. 4, 2014

(65) Prior Publication Data
US 2014/0221192 A1 Aug. 7, 2014

(30) Foreign Application Priority Data
Feb. 5, 2013 (KR) .................. 10-2013-0013014

(51) Int. Cl.
| | |
|---|---|
| B01J 21/18 | (2006.01) |
| B01J 23/40 | (2006.01) |
| B01J 23/48 | (2006.01) |
| B01J 37/00 | (2006.01) |
| H01M 4/90 | (2006.01) |
| H01M 4/92 | (2006.01) |

(52) U.S. Cl.
CPC .......... *H01M 4/9083* (2013.01); *H01M 4/9041* (2013.01); *H01M 4/921* (2013.01); *H01M 4/926* (2013.01); *Y02E 60/50* (2013.01)

(58) Field of Classification Search
CPC ............ B01J 21/18; B01J 23/40; B01J 23/48; B01J 35/0033; B01J 37/00; H01M 4/04; H01M 4/88
USPC ................... 502/101, 184, 185; 429/523–526
See application file for complete search history.

(56) References Cited

U.S. PATENT DOCUMENTS

| | | | | |
|---|---|---|---|---|
| 3,804,779 | A * | 4/1974 | Kent ............................ | 502/185 |
| 6,689,505 | B1 * | 2/2004 | Albers et al. .................. | 429/480 |
| 2010/0129728 | A1 * | 5/2010 | Morimoto et al. ............ | 429/483 |
| 2010/0196789 | A1 * | 8/2010 | Fisher et al. .................. | 429/483 |

FOREIGN PATENT DOCUMENTS

| | | | | |
|---|---|---|---|---|
| KR | 10-2013-0003912 | * | 1/2013 | ............... B01J 37/02 |
| KR | 1020130003912 A | | 1/2013 | |

* cited by examiner

*Primary Examiner* — Patricia L Hailey
(74) *Attorney, Agent, or Firm* — Ladas & Parry LLP

(57) ABSTRACT

The present disclosure relates to a method and an apparatus for preparing nanosized metal or alloy nanoparticles by depositing metal or alloy nanoparticles with superior size uniformity on the surface of a powder as a base material by vacuum deposition and then dissolving or melting the base material using a solvent or heat. The method solves the problems of the existing expensive multi-step synthesis method based on chemical reduction and allows effective synthesis of metal or alloy nanoparticles with very uniform size and metal or alloy catalyst nanoparticles supported on carbon at low cost.

14 Claims, 5 Drawing Sheets

PROCESS OF PREPARING CARBON-SUPPORTED METAL CATALYST BY PHYSICAL DEPOSITION

CROSS-REFERENCE TO RELATED APPLICATIONS

This application claims priority under 35 U.S.C. §119 to Korean Patent Application No. 10-2013-0013014 filed on Feb. 5, 2013 in the Korean Intellectual Property Office, the disclosure of which is incorporated herein by reference in its entirety.

TECHNICAL FIELD

The present disclosure relates to a method for preparing carbon-supported catalyst particles by deposition.

BACKGROUND

Metal or alloy nanoparticles are generally prepared by chemically reducing metal salt precursors. However, the existing method for preparing catalysts by chemical synthesis is disadvantageous in that the expensive metal salt precursors are necessary and particular solvents have to be used depending on the precursors.

Fuel cell catalysts supported on carbon are advantageous in that they can enhance the flow of electrons generated by electrochemical reactions and ensure discharge of water generated by electrochemical reactions, aggregation of the catalysts can be prevented because of the large surface area of the catalysts, transport of fuel gas such as hydrogen or oxygen can be improved, and the triple phase boundary (between the catalyst, Nafion and carbon) can be greatly increased.

For these reasons, many researchers have made efforts to support the highly dispersible nanosized catalyst (platinum) on carbon through chemical reduction. However, it requires many (5 or more) steps and the catalyst precursor costs about 100 times as compared to the sputtered Pt atoms. Accordingly, there is a need for development of a method that allows supporting of very uniform catalyst particles on carbon with a small number of steps and at low cost.

SUMMARY

The present disclosure is directed to providing a method for preparing carbon-supported catalyst particles by physically depositing a metal catalyst on a support exhibiting solubility in a solvent, not by chemical synthesis, which avoids the use of expensive metal salt precursors, allows selection of various solvents and is applicable to large-scale production.

In one general aspect, the present disclosure provides a method for preparing an electrochemical catalyst, including: (a) obtaining a water-soluble support with a metal catalyst or an alloy catalyst deposited by depositing a catalytic metal on a water-soluble support; (b) obtaining a dispersion including the water-soluble support with a metal catalyst or an alloy catalyst deposited and a carbon support; (c) obtaining a dispersion including a metal catalyst supported on the carbon support by stirring the dispersion at high temperature; (d) obtaining the metal catalyst supported on the carbon support in solid phase by washing and filtering the dispersion including the metal catalyst supported on the carbon support; and (e) drying and pulverizing the metal catalyst supported on the carbon support in solid phase.

In accordance with the embodiments of the present disclosure, metal nanoparticles or alloy nanoparticles can be prepared using pure metal instead of expensive metal salt precursors and the powder on which the nanoparticles are deposited can be selected freely. In addition, the solvent required to prepare the catalyst can be selected freely.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1:
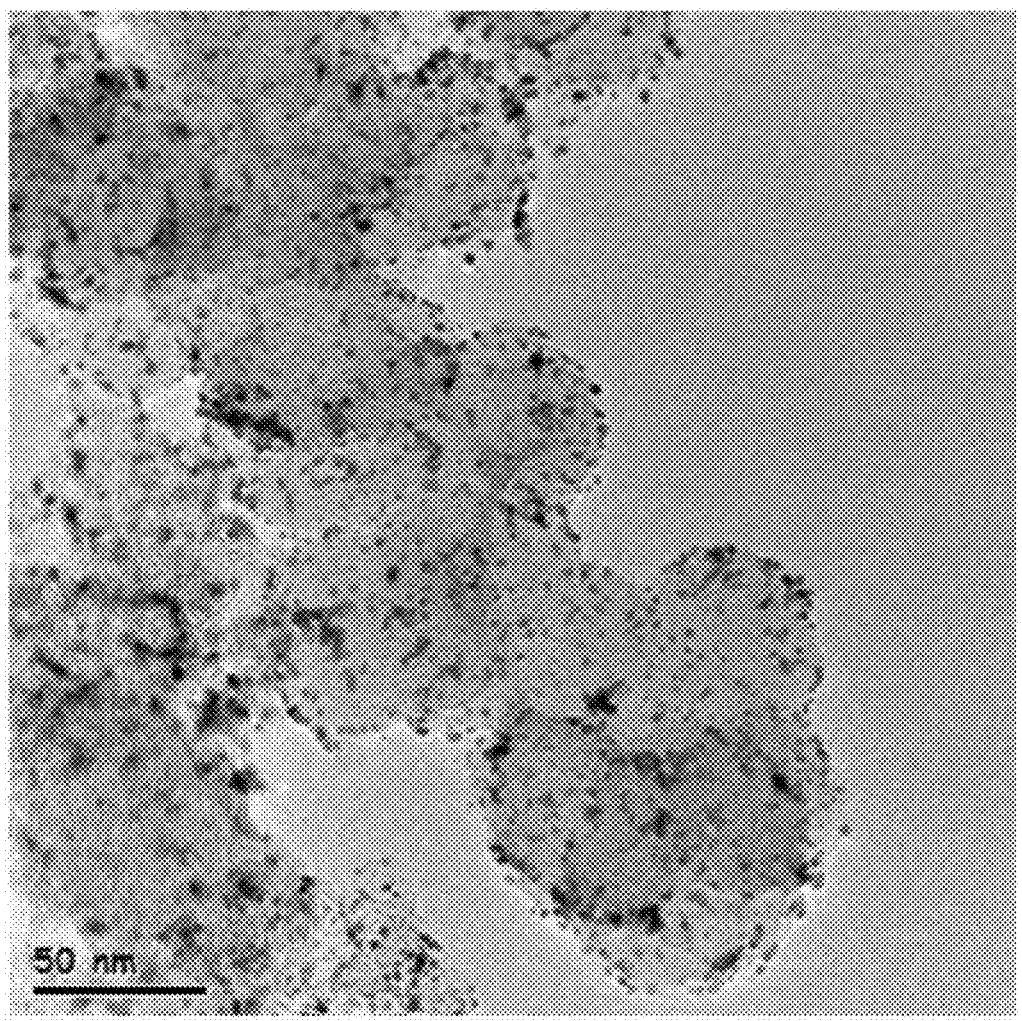
FIG. 1 is a transmission electron microscopic image of a platinum catalyst supported on a carbon support.

Hereinafter, various aspects and exemplary embodiments of the present disclosure will be described in detail.

In an aspect, the present disclosure provides a method for preparing an electrochemical catalyst, including: (a) obtaining a water-soluble support with a metal catalyst or an alloy catalyst deposited by depositing a catalytic metal on a water-soluble support; (b) obtaining a dispersion including the water-soluble support with a metal catalyst or an alloy catalyst deposited and a carbon support; (c) obtaining a dispersion including a metal catalyst supported on the carbon support by stirring the dispersion at 20-90° C. for 1-24 hours; (d) obtaining the metal catalyst supported on the carbon support in solid phase by washing and filtering the dispersion including the metal catalyst supported on the carbon support; and (e) drying and pulverizing the metal catalyst supported on the carbon support in solid phase.

In accordance with the present disclosure, the problems of the existing chemical reduction method (i.e., use of very expensive catalytic metal precursor, unavoidable use of organic solvent and process consisting of many steps) can be solved since physical deposition is employed.

In an exemplary embodiment, the water-soluble support may be selected from sugar powder including glucose, sucrose, fructose, etc., water-soluble metal salt powder including sodium chloride, potassium chloride, sodium bicarbonate, etc., water-soluble polymer powder including PVA, PVP, etc., or a combination thereof.

In another exemplary embodiment, the water-soluble support may be powder of 0.1-500 μm in diameter.

In another exemplary embodiment, the catalytic metal may be selected from platinum, gold, palladium, silver, rhodium, iridium, ruthenium, osmium, or a combination thereof.

In another exemplary embodiment, the metal catalyst may be a catalyst including a metal selected from platinum, gold, palladium, silver, rhodium, iridium, ruthenium and osmium and the alloy catalyst may be a catalyst including an alloy of two or more of platinum, gold, palladium, silver, rhodium, iridium, ruthenium and osmium.

In another exemplary embodiment, the catalytic metal may be deposited at a concentration of 1-10,000 ppm based on the water-soluble support.

In another exemplary embodiment, the deposition may be conducted by sputtering.

In another exemplary embodiment, the deposited catalytic metal particles may be spheres of 1-100 nm in diameter. When the catalytic metal particles are spheres having a diameter in the above range, the metal nanoparticles can be utilized in various applications.

In another exemplary embodiment, the concentration of the deposited catalytic metal particles in the dispersion may be 0.01-10 mmol/L.

In another exemplary embodiment, the weight of the deposited catalytic metal particles in the dispersion may be 0-95 wt % based on the weight of the carbon support.

In another exemplary embodiment, the electrochemical catalyst may be a catalyst for oxygen reduction reaction.

In another exemplary embodiment, the dispersion may be an aqueous dispersion.

In another exemplary embodiment, after the stirring in (c) is completed, the dispersion may be further stirred at room temperature for 1-24 hours. If the stirring is further conducted at room temperature, a dispersion can be prepared freely by selecting a desired solvent. If the additional stirring is not conducted, the electrochemical catalyst can be obtained practically only when an aqueous dispersion is used. In contrast, if the additional stirring is conducted, various solvents other than water, including alcohols or ethers, may be used to obtain the electrochemical catalyst on practical level.

In another exemplary embodiment, the washing and filtering in (d) may be conducted using water.

As described, some of the embodiments of the present disclosure relate to a method for depositing metal or alloy nanoparticles of uniform size on powder that can be dissolved in general solvents by vacuum deposition and a method for preparing metal nanoparticles or alloy nanoparticles and a metal catalyst or an alloy catalyst supported on a support using the prepared powder.

Also, some of the embodiments of the present disclosure relate to a method and an apparatus for depositing metal or alloy nanoparticles with superior size uniformity on the surface of a powder as a base material by vacuum deposition and synthesizing nanosized metal or alloy nanoparticles by melting or dissolving the base material using a solvent or heat, particularly to a method for synthesizing metal or alloy catalyst nanoparticles of very uniform size and metal or alloy catalyst nanoparticles supported on carbon effectively at low cost, thereby solving the problems of the existing multi-step, expensive synthesis method based on chemical reduction.

Figure 6:
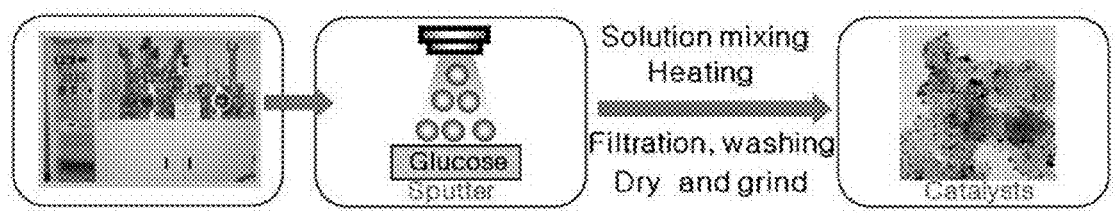
FIG. 6 describes a method for preparing catalyst nanoparticles supported on carbon.

As shown in FIG. 6, nanoparticles are uniformly coated on a base material (glucose, salt or other water-soluble substance) of sub-micrometer size by sputtering. When the coated base material is dissolved in water, the coated metal forms spheres to reduce surface area thermodynamically and forms a colloid in water. If carbon is put in the colloidal solution, the nanoparticles are physically adsorbed onto the carbon. Then, as shown in the right-side image in FIG. 6, catalyst nanoparticles supported on carbon are obtained with very uniform size of 4-8 nm.

Hereinafter, the present disclosure will be described in more detail through an examples. However, the following example is for illustrative purpose only and not intended to reduce or limit the scope of this disclosure.

Example

About 20 kg of dried glucose powder was put in a vacuum deposition apparatus and a platinum target was loaded on a DC magnetron sputter. After loading the powder in the vacuum deposition apparatus, a vacuum state was formed using a vacuum pump. Initially, the vacuum state was maintained at about $10^{-1}$ to $10^{-6}$ torr. Platinum nanoparticles were deposited by sputtering while operating an agitator. The sputtering rate can be controlled with input power, generally in the range of 1-200 W/cm$^2$. The concentration of platinum can be controlled to be 1-10000 ppm based on glucose.

A carbon-supported catalyst was prepared using the prepared powder using distilled water that can dissolve glucose as a solvent. A carbon support was uniformly dispersed in distilled water through ultrasonication and, after adding the powder having the metal particles deposited (platinum concentration=2500 ppm) thereto, the mixture solution was heated at 80° C. for 2 hours so that glucose could be completely dissolved and then cooled to room temperature. The cooled mixture solution was stirred sufficiently so that the nanoparticles could be completely impregnated into the support.

The structure of the platinum catalyst supported on the carbon support was analyzed by transmission electron microscopy (TEM). FIG. 1 shows an image of the catalyst wherein 20 wt % platinum is supported on Vulcan XC-72 carbon support, which was prepared using 2500 ppm platinum deposited on glucose powder by PVD. From the image, it can be seen that uniform platinum particles with 3 nm size are uniformly distributed on the carbon support. Also, it was investigated whether catalysts could be prepared in the same way using other metals.

Figure 2:
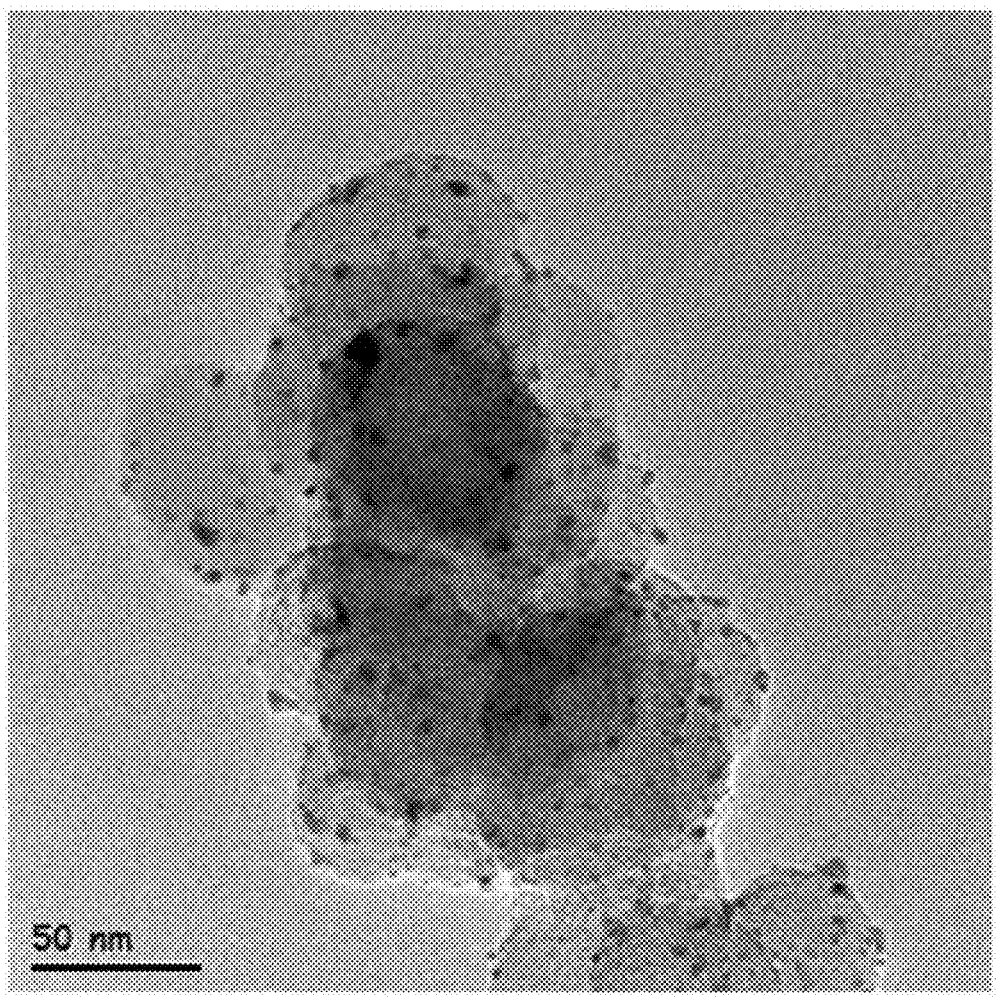
FIG. 2 is a transmission electron microscopic image of a palladium catalyst supported on a carbon support.
Figure 3:
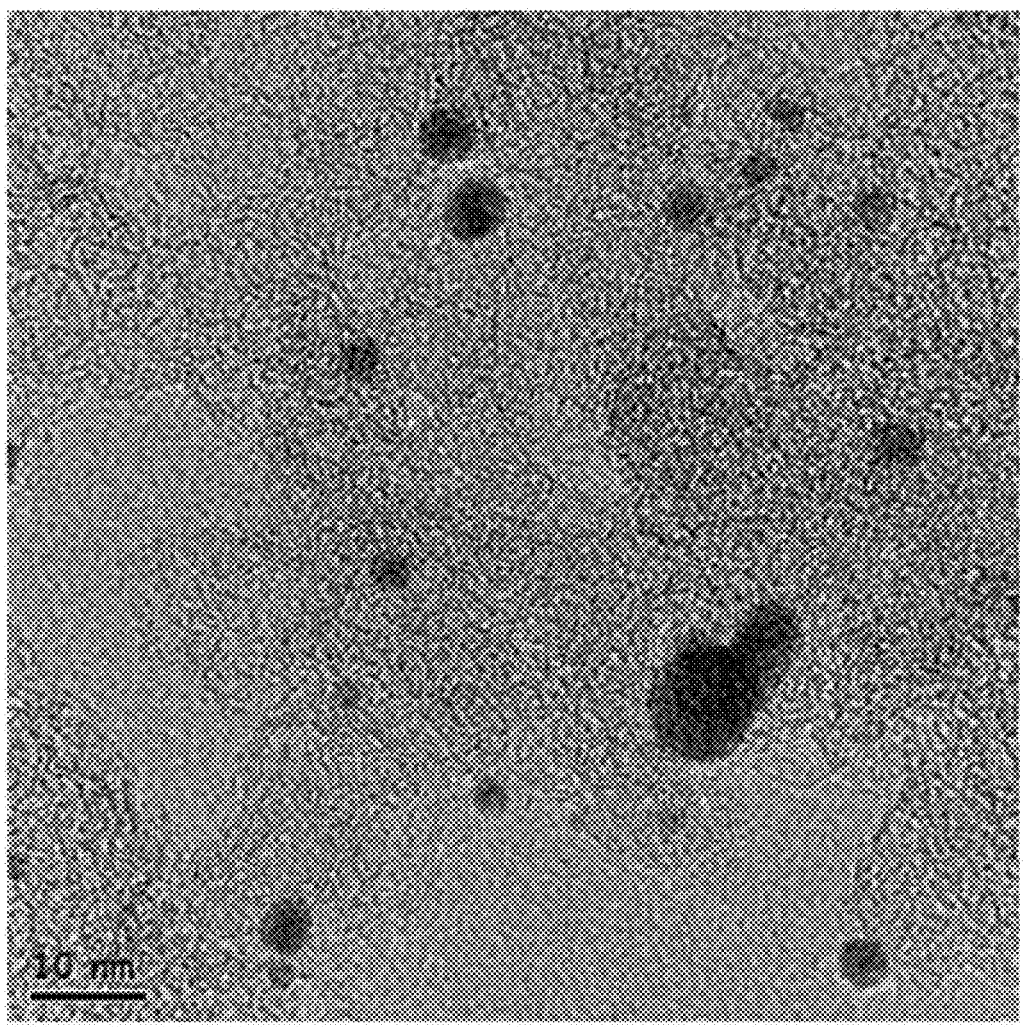
FIG. 3 is a transmission electron microscopic image of a gold catalyst supported on a carbon support.

FIG. 2 and FIG. 3 show TEM images of carbon-supported catalysts prepared using palladium or gold deposited on glucose powder by PVD, respectively. It can be seen that the metal particles with an average size of 3 nm and 5 nm, respectively, are uniformly distributed on the carbon support.

Figure 4:
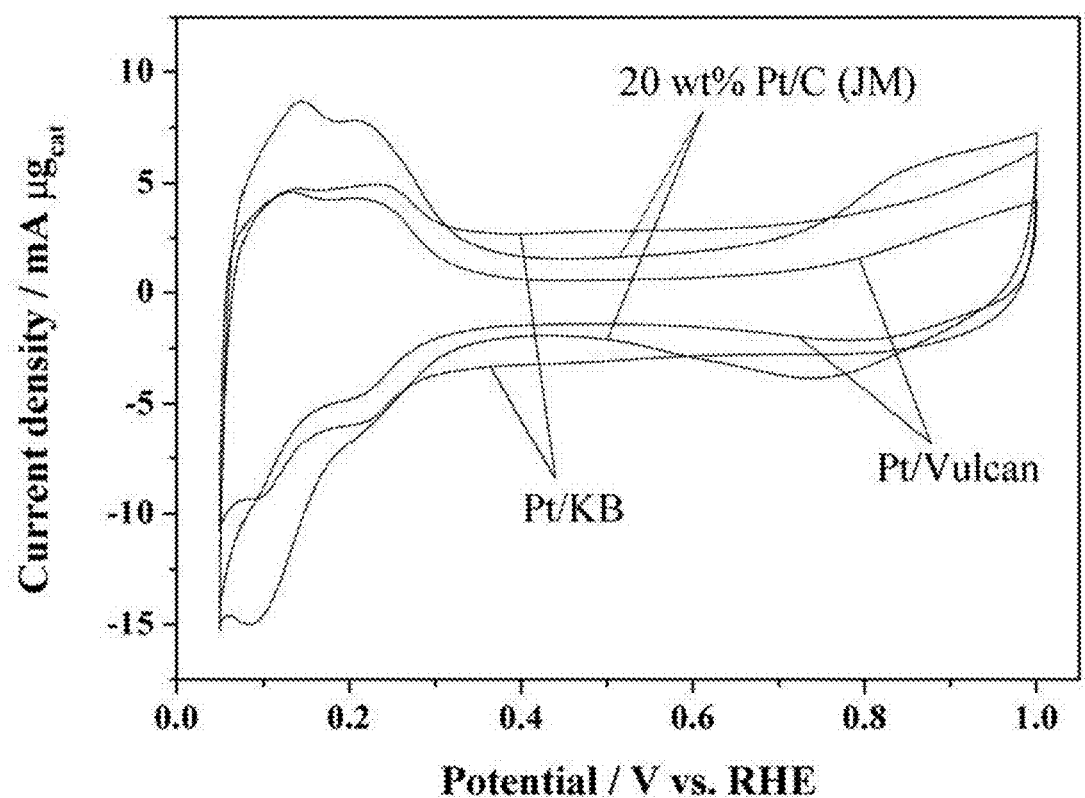
FIG. 4 shows cyclic voltammograms of platinum catalysts supported on carbon supports.

The characteristics of the prepared catalysts were analyzed by cyclic voltammetry. FIG. 4 shows cyclic voltammograms of a 20 wt % Pt/C catalyst (Johnson Matthey) and platinum catalysts wherein 20 wt % platinum was supported on Vulcan XC-72 carbon support or ketjen black carbon support using Pt deposited on glucose powder. The peaks between 0.05 and 0.45 V correspond to desorption of hydrogen from the platinum surface and the active surface area of the catalysts could be calculated from the peak areas. The Johnson Matthey's 20 wt % Pt/C catalyst had a specific surface area of 45.8 m$^2$/g, the catalyst supported on ketjen black had a specific surface area of 17.7 m$^2$/g, and the catalyst supported on Vulcan XC-72 had a specific surface area of 29.4 m$^2$/g.

Figure 5:
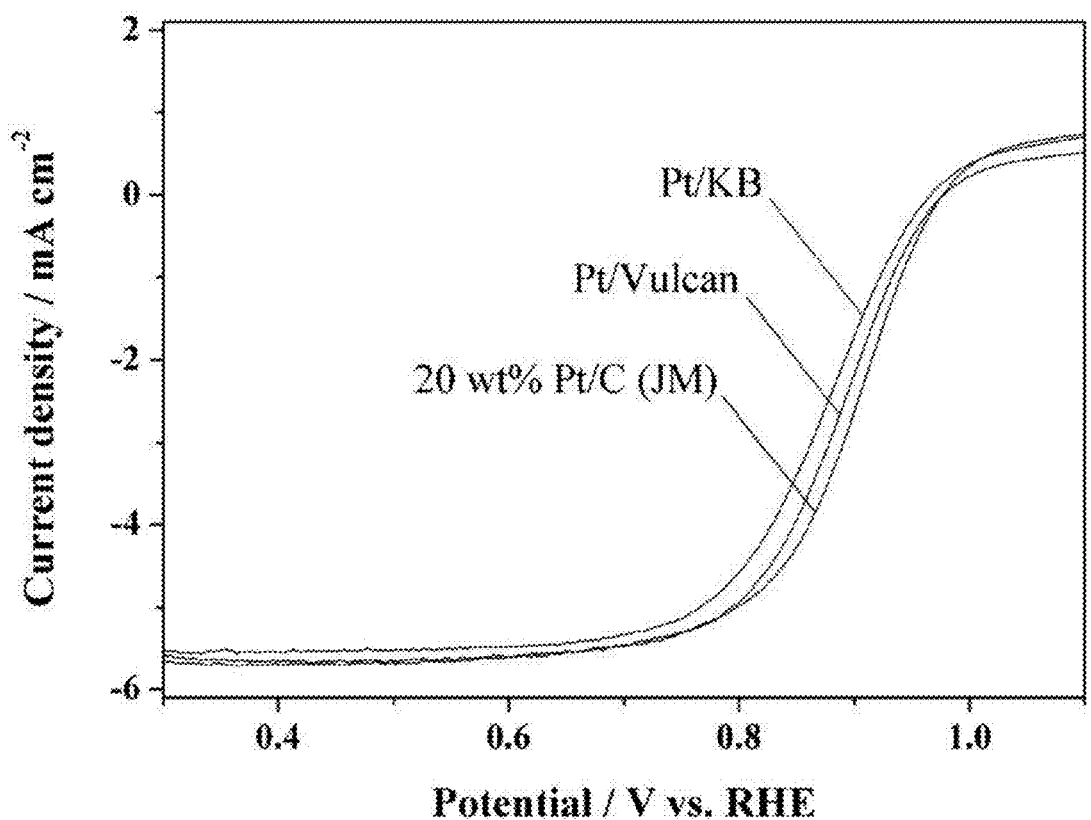
FIG. 5 shows polarization curves for oxygen reduction reaction of platinum catalysts supported on carbon supports.

In order to evaluate the oxygen reduction reaction (ORR) of the catalysts, polarization curves for oxygen reduction reaction were obtained using a rotating disk electrode (RDE). In the polarization curves for oxygen reduction reaction shown in FIG. 5, the shift of the half-wave potential toward higher potential can be interpreted as higher activity for the oxygen reduction reaction. When Vulcan XC-72 was used as the carbon support, the half-wave potential was 883 mV, which is almost comparable to that of the Johnson Matthey's 20 wt % Pt/C catalyst (895 mV) which is known as one of the fuel cell catalysts that exhibit the best activity.

Although experimental results are not presented in the present disclosure, gold and palladium catalysts prepared in the same manner also exhibited almost comparable activity to that of the existing catalyst.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing an electrochemical catalyst, comprising:

obtaining a water-soluble support with a metal catalyst or an alloy catalyst deposited by depositing a catalytic metal on a water-soluble support;

obtaining a dispersion comprising the water-soluble support with a metal catalyst or an alloy catalyst deposited and a carbon support;

obtaining a dispersion comprising a metal catalyst supported on the carbon support by stirring the dispersion at 80-90° C. for 1-24 hours, and stirring the dispersion comprising a metal catalyst supported on the carbon support at room temperature for 1-24 hours;

obtaining the metal catalyst supported on the carbon support in solid phase by washing and filtering the dispersion comprising the metal catalyst supported on the carbon support; and drying and pulverizing the metal catalyst supported on the carbon support in solid phase, wherein the water-soluble support is selected from sugar powder comprising glucose, sucrose and fructose, water-soluble metal salt powder comprising sodium chloride, potassium chloride and sodium bicarbonate, water-soluble polymer powder comprising PVA and PVP, or a combination thereof.

2. The method for preparing an electrochemical catalyst according to claim 1, wherein the water-soluble support is powder of 1-100 nm in diameter.

3. The method for preparing an electrochemical catalyst according to claim 1, wherein the catalytic metal is selected from platinum, gold, palladium, silver, rhodium, iridium, ruthenium, osmium, or a combination thereof.

4. The method for preparing an electrochemical catalyst according to claim 1, wherein the metal catalyst is a catalyst comprising a metal selected from platinum, gold, palladium, silver, rhodium, iridium, ruthenium and osmium and the alloy catalyst is a catalyst comprising an alloy of two or more of platinum, gold, palladium, silver, rhodium, iridium, ruthenium and osmium.

5. The method for preparing an electrochemical catalyst according to claim 1, wherein the catalytic metal is deposited at a concentration of 1-10,000 ppm based on the water-soluble support.

6. The method for preparing an electrochemical catalyst according to claim 1, wherein the deposition is conducted by sputtering.

7. The method for preparing an electrochemical catalyst according to claim 1, wherein the deposited catalytic metal particles are spheres of 1-100 nm in diameter.

8. The method for preparing an electrochemical catalyst according to claim 1, wherein the concentration of the deposited catalytic metal particles in the dispersion is 0.01-10 mmol/L.

9. The method for preparing an electrochemical catalyst according to claim 1, wherein the weight of the deposited catalytic metal particles in the dispersion is 0-95 wt % based on the weight of the carbon support.

10. The method for preparing an electrochemical catalyst according to claim 1, wherein the electrochemical catalyst is a catalyst for oxygen reduction reaction.

11. The method for preparing an electrochemical catalyst according to claim 1, which further comprises, after said stirring is completed, stirring the dispersion at room temperature for 1-24 hours.

12. The method for preparing an electrochemical catalyst according to claim 1, wherein said washing and filtering are conducted using water.

13. The method for preparing an electrochemical catalyst according to claim 1, wherein the dispersion is an aqueous dispersion.

14. A method for preparing an electrochemical catalyst, comprising:

obtaining a water-soluble support with a metal catalyst or an ahoy catalyst deposited by depositing a catalytic metal on a water-soluble support;

obtaining a dispersion comprising the water-soluble support with a metal catalyst or an alloy catalyst deposited and a carbon support;

obtaining a dispersion comprising a metal catalyst supported on the carbon support by stirring the dispersion at 80-90° C. for 1-24 hours, and stirring the dispersion comprising a metal catalyst supported on the carbon support at room temperature for 1-24 hours;

obtaining the metal catalyst supported on the carbon support in solid phase by washing and filtering the dispersion comprising the metal catalyst supported on the carbon support; and drying and pulverizing the metal catalyst supported on the carbon support in solid phase.

* * * * *